United States Patent [19]

Kawakami

[11] Patent Number: 5,574,708
[45] Date of Patent: Nov. 12, 1996

[54] OPTICAL DISK APPARATUS PERFORMING DATA WRITING TEST

[75] Inventor: Izumi Kawakami, Yokohama, Japan

[73] Assignee: Kabushiki Kaisha Toshiba, Kawasaki, Japan

[21] Appl. No.: 522,704

[22] Filed: Sep. 1, 1995

[30] Foreign Application Priority Data

Sep. 1, 1994 [JP] Japan .................................. 6-208723

[51] Int. Cl.⁶ .................................................. G11B 7/00
[52] U.S. Cl. ............................... 369/58; 369/60; 369/84
[58] Field of Search ............................ 369/32, 44.26, 369/54, 48, 58, 124, 59, 84, 60; 360/53

[56] References Cited

U.S. PATENT DOCUMENTS

| | | | |
|---|---|---|---|
| 5,121,262 | 6/1992 | Squires et al. | 360/46 |
| 5,351,227 | 9/1994 | Ichikawa | 369/54 |
| 5,379,276 | 1/1995 | Igami et al. | 369/54 |

Primary Examiner—Nabil Z. Hindi
Attorney, Agent, or Firm—Cushman, Darby & Cushman

[57] ABSTRACT

An optical disk apparatus in which a write cache processing is executed, comprising a writing function for writing test data to a predetermined area of the optical disk when no write data processing is provided, a checking function of reading test data to check whether the writing function is normal or abnormal, a function of performing the write cache processing in the case of the test writing being normal, and performing the ordinary writing processing in the case of the test writing being abnormal.

6 Claims, 6 Drawing Sheets

| ZONE NUMBER | SECTOR / CIRCUIT | CLOCK FREQUENCY (DIVISION VALUE) |
|---|---|---|
| 1 | 30 | -------- |
| 2 | 31 | -------- |
| 3 | 32 | -------- |
| 4 | 33 | -------- |
| ⋮ | ⋮ | |
| 19 | 48 | -------- |

OPTICAL DISK APPARATUS PERFORMING DATA WRITING TEST

BACKGROUND OF THE INVENTION

1. Field of the Invention

The present invention relates to an optical disk apparatus for writing data to an optical disk or reading data written thereon.

2. Description of the Related Art

In a conventional optical disk apparatus for writing data to an optical disk or reading data written thereon, write back process is performed by use of a cache memory in order to improve the speed of writing data to the optical disk apparatus.

The write back processing is performed in accordance with the following steps.

More specifically, write data received from the host computer is stored in a data buffer memory. At the time when the storage of write data is ended, a normal end of the write back processing is indicated to the host computer. Then, write data, which is stored in data buffer memory during a vacant time when no communication with the host computer is performed, is written to the optical disk. As a result, efficient writing can be performed without having to take into consideration the relationship between write timing and data transfer timing.

If an abnormality occurs in the write back processing, it is informed that the previous write command processing is abnormally ended at the time of receiving a command from a next host computer. However, since the host computer once received the signal of the normal end, there is a case in which previous write data is not left and no data exists therein.

Therefore, in a case where an abnormality occurs in the write back processing, no previous write data is maintained in the host computer even if the occurrence of an abnormality is informed to the host computer. Moreover, write data cannot be left in the optical disk. Due to this, there is a problem in that write data is lost.

SUMMARY OF THE INVENTION

An object of the present invention is to provide an optical disk apparatus wherein write data is not lost even if abnormality of a write-back processing occurs during an operation of writing data between a host computer and an optical disk.

According to the present invention, a data processing apparatus is provided for establishing communication with an outer unit and for storing data received from the outer unit in an optical data storing medium, comprising: receiving means for temporarily storing data sent from the outer unit in the optical data storing medium; first storing means for storing data temporarily stored by the receiving means in a data storing area of the optical data storing medium during a vacant time when no communication with the outer unit is established; second storing means for storing specific data in an area other than the data storing area of the optical data storing medium during the time when no storing operation is executed by the first storing means; means for reading data stored in the second storing means; means for checking whether or not data read by the reading means is normal; and means for providing a response representing an end of data storing to the optical data storing medium to the outer unit at the time when receiving processing of data to be stored in the optical data storing medium is completed by the receiving means if the checking means determines that data read by the reading means is normal, and for providing a response representing an end of data storing to the optical data storing medium to the outer unit at the time when processing of the second storing means is completed if the checking means determines that data read by the reading means is not normal.

According to the above-mentioned structure, unlike the conventional apparatus, the writing operation is not started immediately after the writing command is received. According to the present apparatus, a trial writing of test data to a test area of the optical disk is performed at least once so as to test a function of the writing operation. Then, after confirming the normal operation of the writing operation, the original data writing operation is started. As a result if data transfer between the host computer and the optical disk apparatus is performed by the write-back processing, data can be prevented from being lost even if there is an error in the writing function.

More specifically, in the conventional apparatus, in the write-back processing, all data to be written is stored in the cache memory of the optical disk, and a signal indicative of the end of the writing is provided to the host computer at this stage. Then, data of the cache memory is written to the optical disk. However, at this time, if trouble with the writing function such as with the optical disk itself, the driver, or the cache memory occurs, data is erased by the host computer, because the host computer judges such trouble as the end of writing. Due to this, it can be considered the case in which data can not be stored and erased. However, according to the present invention, because the signal, such as the end of writing, is sent to the host computer after confirming that the writing function is normally operated, such a data erase is not generated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The accompanying drawings, the detailed description of the preferred embodiments are given below.

Figure 1:
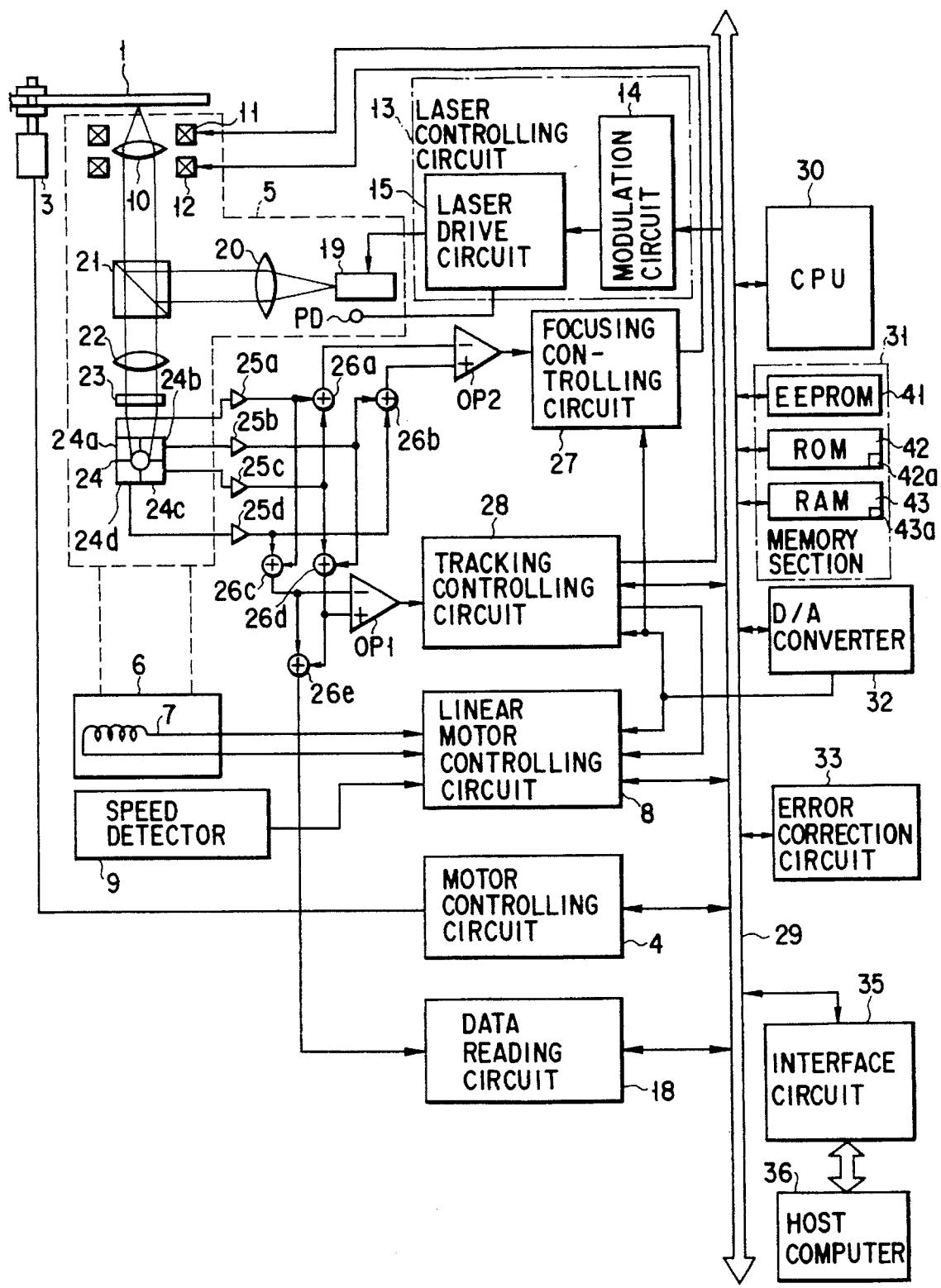
FIG. 1 is a block diagram showing the entire structure of an optical disk apparatus of an embodiment of the present invention.

FIG. 1 shows an optical disk apparatus. The optical disk apparatus writes data to an optical disk 1 by use of focusing light or reads written data.

The optical disk 1 is formed such that a surface of a substrate, which is circularly formed of glass or plastic, is coated with a metal coating layer such as tellurium or bismuth in a doughnut shape.

Figure 2:
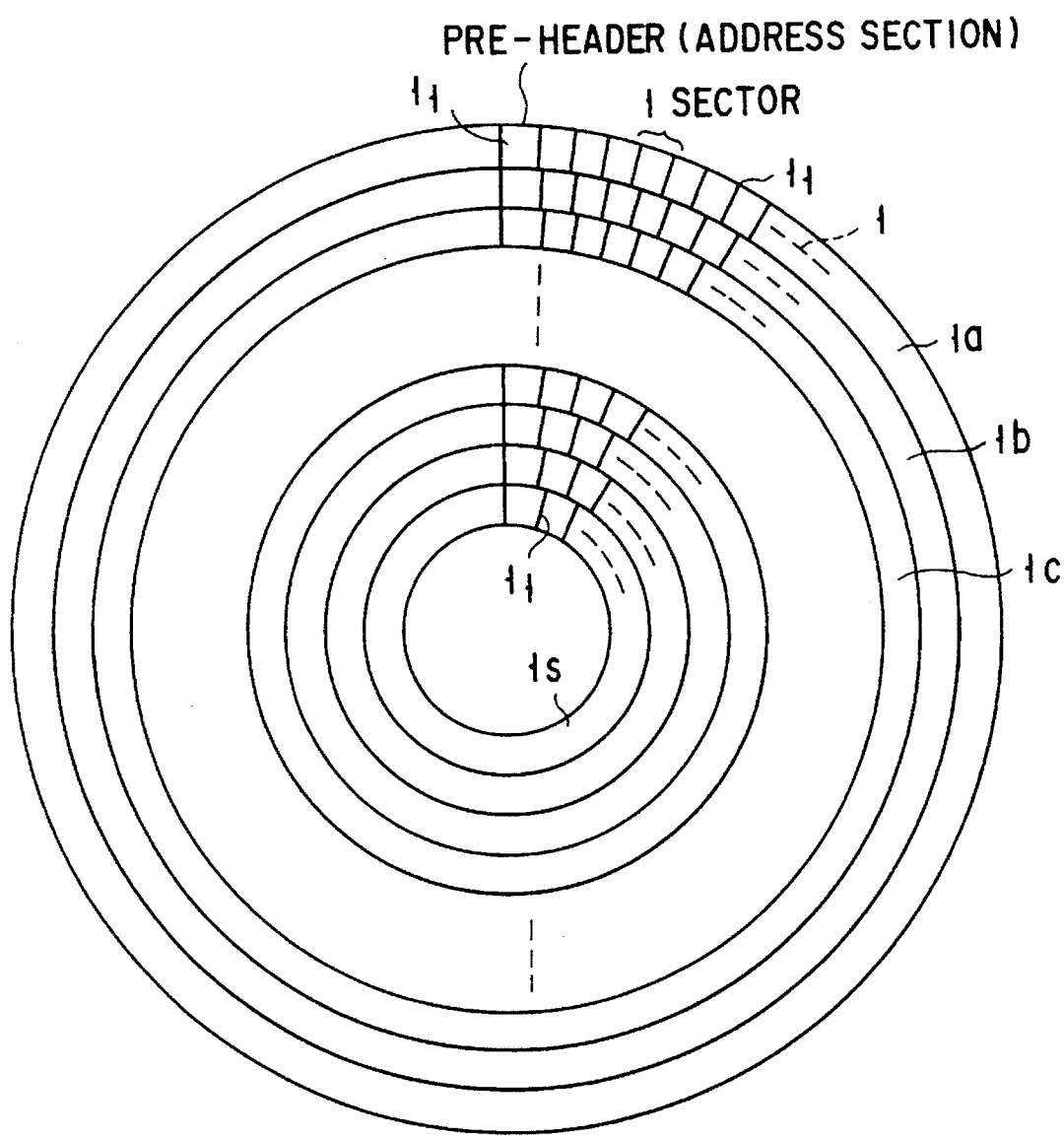
FIG. 2 is a view explaining an example of a format of the optical disk of FIG. 1.

As shown in FIG. 2, the optical disk 1 is radially divided into a plurality of zones $1a, \ldots 1s$ comprising a plurality of tracks. A frequency value of a clock signal of each of zone $1a, \ldots$ differs (the value is increased as advancing from an inner periphery to an outer periphery), and the number of sectors of one track of each of zone $1a \ldots$ differs. The relationship between a dividing value corresponding to the frequency value of the clock signal of each of zone $1a, \ldots$ and the number of sectors of one track is written in a table 42a of ROM 42 to be described later as shown in FIG. 3.

Headers 1, . . . , to which an address is written, are pre-formatted in the respective tracks of the respective zone $1a, \ldots$ of the optical disk 1. In each sector, data for one block having the same capacity is written.

The above explains the case in which a disk of an M-CAV (modified constant angular velocity) system is used as optical disk 1. However, the present invention is not limited to the above case. A disk of CAV (constant angular velocity) system may be used.

Figures 3, 4:
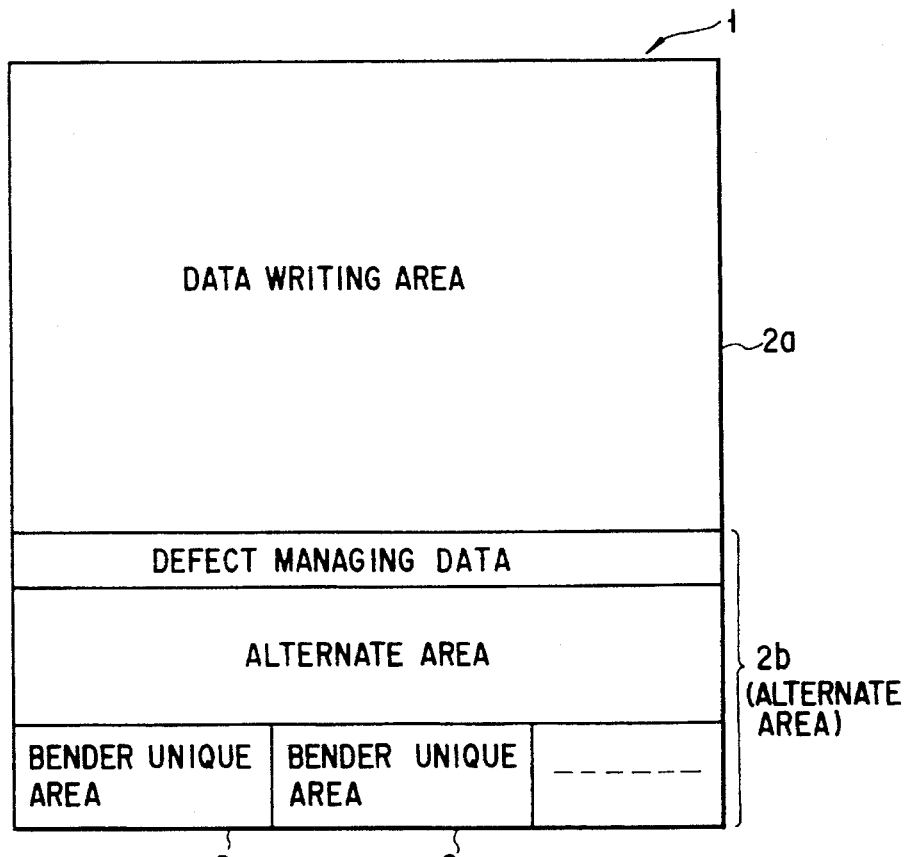
FIG. 3 is a view explaining a frequency value of a clock signal of each zone.
FIG. 4 is a view explaining an area structure of the optical disk.

As shown in FIG. 4, the optical disk 1 comprises a data writing area 2a, which is used by a user, and an alternate area 2b in which defect managing data is written and an alternate block is prepared. A detective block of the data writing area 2a is replaced with the alternate block in writing (or manufacturing).

Defective managing data, which shows a defect found during writing, that is, data, which designates the alternate block in place of the block in which correct writing cannot be performed at the time of writing. For example, a correct writing is checked by whether or not written data can be correctly read (read-after-write). Then, an alternate block number for a block number in which a correct writing cannot be performed is written. In other words, the above detective managing data is address data for designating a data writing to another area based on the check of the defective area.

The alternate area 2b includes bender unique areas 2c, (first and second trial writing areas). In the bender unique areas 2c, . . . , a trial pattern including a number of trial writings times as trial writing data is written.

In FIG. 1, the optical disk 1 is rotated at a fixed speed by a motor 3. The motor 3 is controlled by a motor controlling circuit 4.

Data writing and reading to/from the optical disk 1 are performed by an optical head 5. The optical head 5 is fixed to a drive coil 7 forming a movable section of a linear motor 6. The drive coil 7 is connected to a linear motor controlling circuit 8.

A speed detector 9 is connected to the linear motor controlling circuit 8, and a speed signal of the optical head 5 is sent to the linear motor controlling circuit 8.

Moreover, a permanent magnet (not shown) is provided in a fixing section of the linear motor 6. The drive coil 7 is excited by the linear motor controlling circuit 8, so that the optical head 5 is moved in a radial direction of the optical disk 1.

In the optical head 5, there is provided an objective lens 10, which is supported by a wire (not shown) or a plate spring. The objective lens 10 is moved in a focusing direction (direction of an optical axis of lens) by a drive coil 11. Also, the objective lens 10 can be moved in a tracking direction (direction perpendicular to the optical axis of lens).

Furthermore, a semiconductor laser generator 19 is driven by a laser controlling circuit 13 to generate a laser beam. The laser controlling circuit 13 comprises a modulation circuit 14, and a laser driving circuit 15 to be operated in synchronization with a clock signal for writing sent from a PLL circuit (not shown). The PLL circuit divides the basic signal sent from an generator (not shown) into a frequency corresponding to a writing position on the optical disk 1 so as to generate a clock signal for writing.

The modulating circuit 14 modulates writing data sent from an error correcting circuit 33 (to be described later) to a signal, which is suitable for writing, that is, 2-7 modulation data. The laser driving circuit 15 drives the semiconductor laser generator (or argon neon laser generator) 19 of the optical head 5 by 2-7 modulation data obtained by the modulating circuit 14.

The optical disk 1 is irradiated with the laser beam generated by the semiconductor laser generator 19 (or argon neon laser generator) driven by the laser driving circuit 15 of the laser controlling circuit 13 through a collimator lens 20, a half prism 21, the objective lens 10. A reflected light sent from the optical disk 1 is guided to a photodetector 24 through the objective lens 10, the half prism 21, a condenser lens 22, and a cylindrical lens 23.

The photodetector 24 comprises four divided photodetection cells 24a, 24b, 24c, and 24d.

An output signal of the photodetection cell 24a is supplied to one end of an adder 26a through an amplifier 25a, an output signal signal of the photodetection cell 24b is supplied to one end of an adder 26b through an amplifier 25b, an output signal signal of the photodetection cell 24c is supplied to the other end of an adder 26a through an amplifier 25c, and an output signal signal of the photodetection cell 24d is supplied to the other end of an adder 26b through an amplifier 25d.

The output signal of the photodetection cell 24a of the photodetector 24 is supplied to one end of the adder 26c through the amplifier 25a, the output signal of the photodetection cell 24b of the photodetector 24 is supplied to one end of the adder 26d through the amplifier 25b, the output signal of the photodetection cell 24c of the photodetector 24 is supplied to the other end of the adder 26d through the amplifier 25c, and the output signal of the photodetection cell 24d of the photodetector 24 is supplied to the other end of the adder 26c through the amplifier 25d.

An output signal of the adder 26a is supplied to a reverse input of a differential amplifier OP2, and an output signal of the adder 26b is supplied to a non-reverse input of the differential amplifier OP2. The differential amplifier OP2 supplies a signal of a focusing point to a focusing controlling circuit 27 in accordance with a difference between the adders 26a and 26b. An output signal of the focusing controlling circuit 27 is supplied to the focusing drive coil 12 such that the laser beam is focused on the optical disk 1.

An output signal of the adder 26c is supplied to a reverse input of a differential amplifier OP1, and an output signal of the adder 26d is supplied to a non-reverse input of the differential amplifier OP1. The differential amplifier OP1 supplies a tracking differential signal to a tacking controlling circuit 28 in accordance with a difference between the adders 26c and 26d. The tracking controlling circuit 28 prepares a track drive signal in accordance with the track differential signal supplied from the differential amplifier OP1.

The drive signal output from the tracking controlling circuit 28 is supplied to the drive coil 11 of the tracking direction. The track differential signal used in the tracking controlling circuit 28 is supplied to the linear motor controlling circuit 8. A change of reflectance of a pit (writing data) formed on the track is reflected in a sum signal of outputs of the respective photodetection cells 24a to 24d of the photodetector 24 in a state that above-mentioned focusing and tracking are performed, that is, a signal, which is obtained by adding output signals from the adders 26c and 26d. The sum signal is supplied to a data reading circuit 18, and written data is read by the data reading circuit 18.

Data read by the data reading circuit 18 is output to the error correcting circuit 33 through a bus 29. The error correcting circuit 33 corrects an error in accordance with an error correction code of reading data, or provides the error correction code ECC to writing data to be supplied from an interface circuit 35 so as to be outputted to a data buffer area (cache) 43a of a RAM 43 of a memory section 31.

Reading data whose error is corrected by the error correction circuit 33 is output to an outer unit 36 (host computer), such as an optical disk controlling device, through the bus 29 and the interface circuit 35. Writing data is supplied to the error correcting circuit 33 through the interface circuit 35 and the bus 29 from the host computer 36.

Also, when thee objective lens 10 is moved by the tracking controlling circuit 28, the linear motor controlling circuit 8 is set such that the objective lens 10 is positioned in the vicinity of the central position of the optical head 5, that is, the linear motor 6, i.e., the optical head 5 is moved.

Moreover, in the optical disk apparatus, there is provided a D/A converter 32, which is used to receive and transmit data between a CPU 30 for controlling the entire optical disk apparatus and each of the focusing controlling circuit 27, a tracking control circuit 28, and the linear motor controlling circuit 8.

The motor controlling circuit 4, the linear motor controlling circuit 8, the laser controlling circuit 15, the data reading circuit 18, the focusing controlling circuit 27, the tracking controlling circuit 28, and the error correcting circuit 33 are controlled through the bus 29 by the CPU 30. The CPU 30 is set to perform a predetermined operation by a control program recorded in the ROM 42 of the memory section 31.

The memory section 31 comprises an EEPROM 41, the ROM 42, and a RAM 43. The EEPROM 41 stores a number of life times (number of times of possible writing) serving as a life time corresponding to an optical disk number of each optical disk 1, a number of writing times (number of rewriting times) of each block of each optical disk 1, and data, which shows whether or not the data buffer memory section 43 can be used as a write cache. The ROM 42 stores the control program and initial data of the trial pattern, and the table 42a of the frequency value of each zone. The RAM 43 is used for working, and has the data buffer area 43a storing write data.

Also, the above number of life times may be stored in EEPROM 41 as a numerical value, which is provided from the beginning to correspond to the optical disk. As shown in the flow charts of FIGS. 5 to 7, the number of life times may be stored in EEPROM 41 based on the result of the trial writing operation.

The number of writing times (number of rewriting times) of each block, which is stored in the EEPROM 41, may be written in each block of the optical disk 1.

Figure 5:
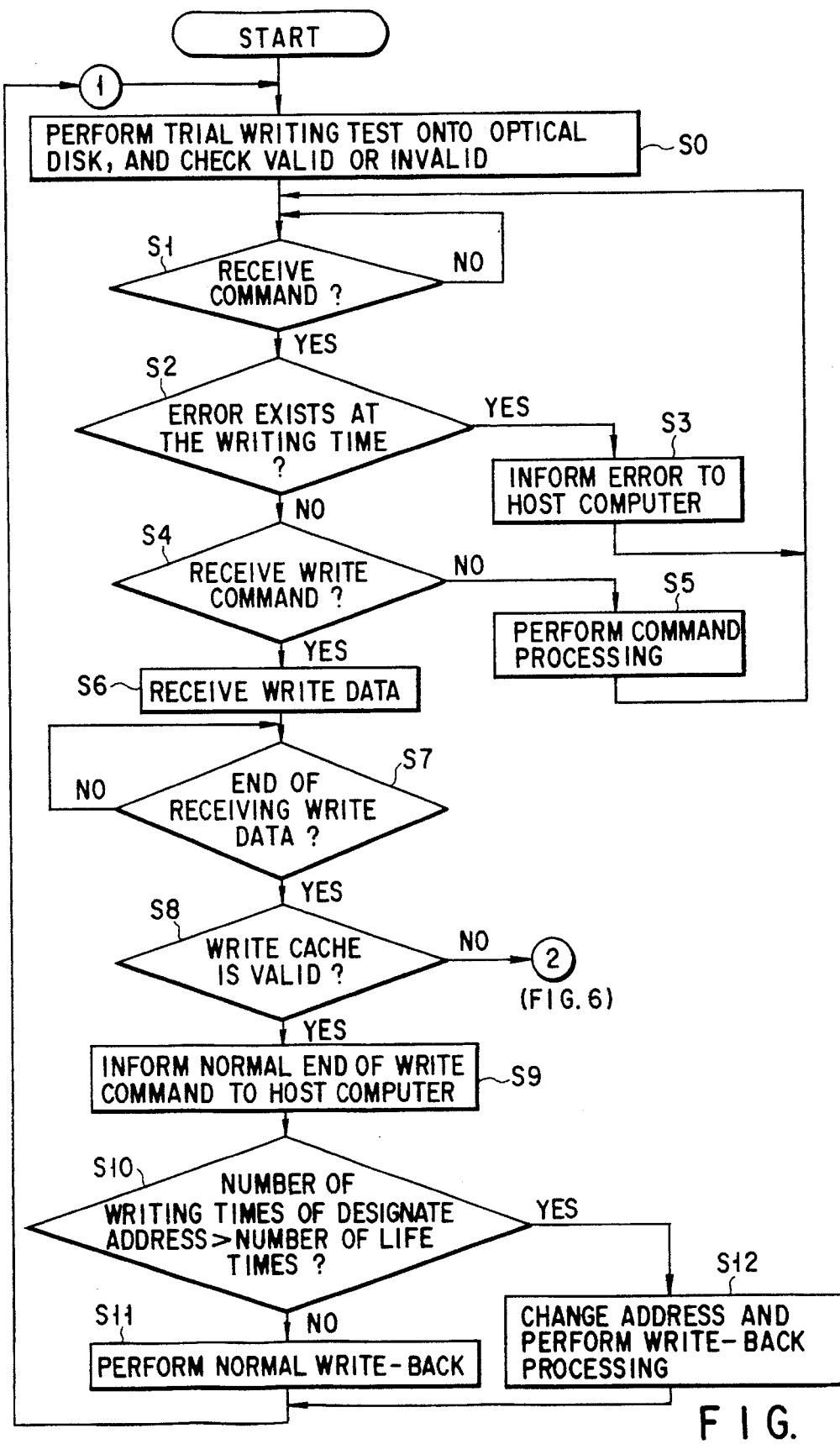
FIG. 5 is a flow chart explaining an operation of the present invention.
Figure 6:
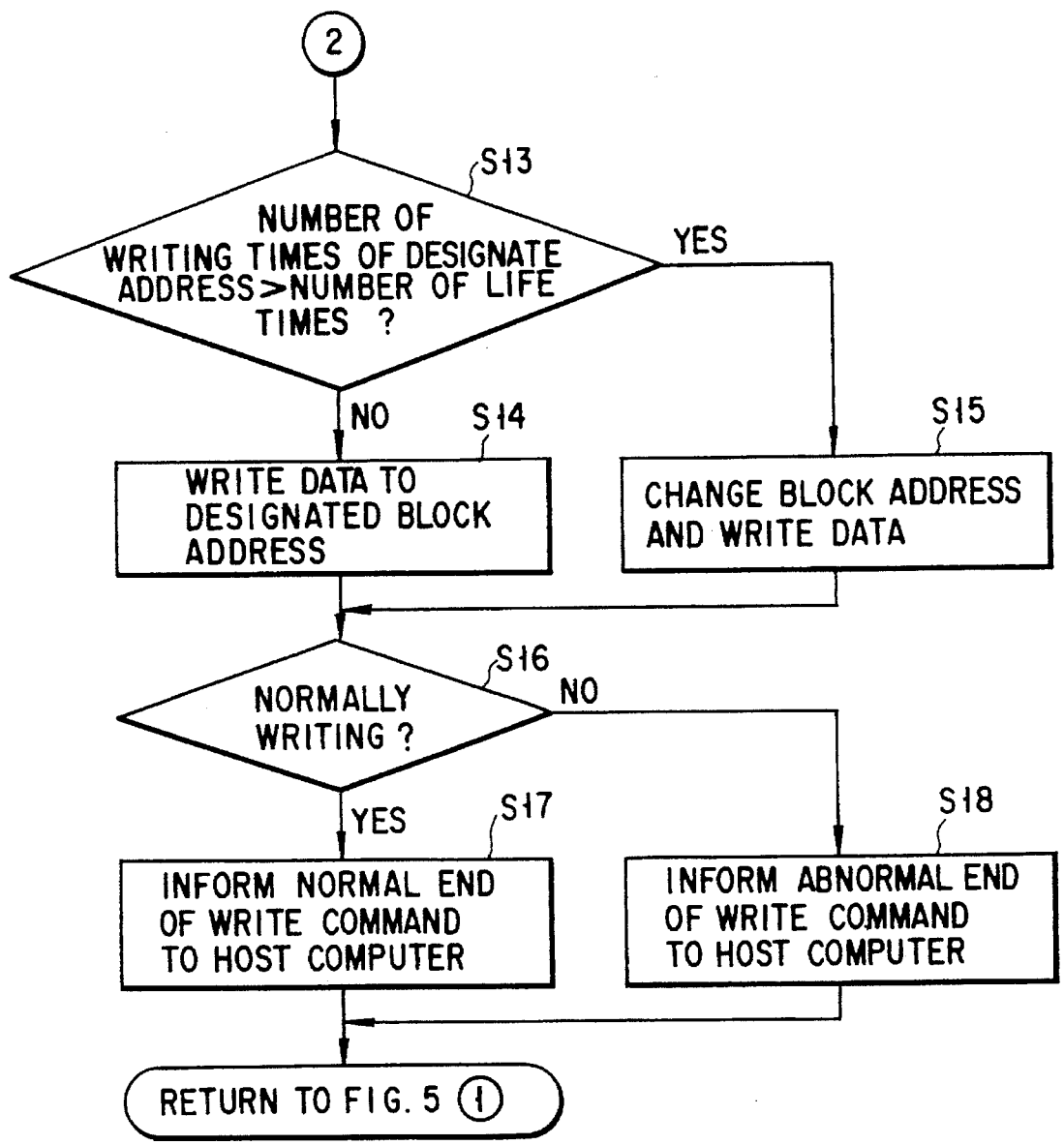
FIG. 6 is a flow chart explaining an operation of the present invention.
Figure 7:
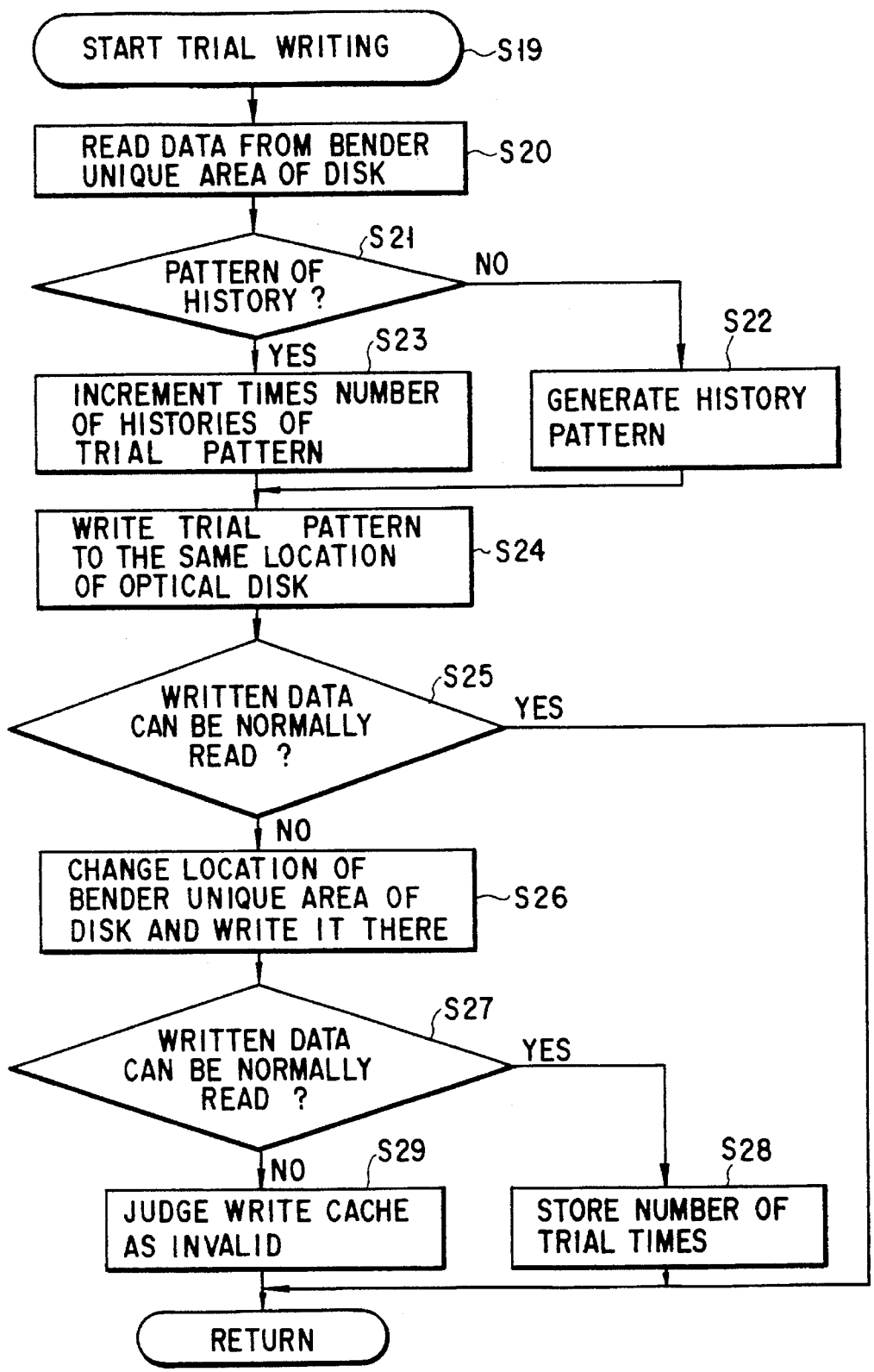
FIG. 7 is a flow chart explaining an operation of the present invention.

According to the above-mentioned structure, the following will explain an operation of the apparatus with reference to the flow charts of FIGS. 5 to 7.

If power to the optical disk is turned on, the trial writing is first performed in the bender unique area of the optical disk (Step S0 of FIG. 5) as shown in the flow chart of FIG. 7. In this case, an example in which the trial writing is performed twice is shown.

In FIG. 7, first of all, data is read from bender unique area 2c of the optical disk 1 (step S20). CPU 30 checks whether or not read data is the history pattern (S21). If it is not the history pattern, CPU 30 reads the history pattern from the ROM 42 (step S22), and the trial pattern is written in the same bender unique area 2c (Step S24). Then, it is checked whether or not data written in the bender unique area 2c in step 24 can be normally read (step S25). If data can be normally read, the operation of CPU 30 is returned to step 1. If data cannot be normally read, CPU 30 changes the location of the bender unique area 2c of the optical disk 1, and writes the trial pattern (step S26).

Then, it is checked whether or not data written in the bender unique area 2c in step 26 can be normally read (step S27). If data can be normally read, CPU 30 judges that the number of times of histories in the trial pattern as the number of times of possible rewriting (life time) of each block unit of the optical disk 1, and stores the number of trial times to the EEPROM 41 to correspond to the optical disk number (step S28) as the number of life times, and the operation goes to step 1.

As a result of the check in the step S27, if data cannot be normally read, CPU 30 judges that the write cache is off (nullity), and stores the write-cache-off in the EEPROM 41, and the operation goes to step 1. The above explains the example in which the trial writing is performed twice. However, even if the trial writing is performed only once, it is needless to say that the same advantage of the present invention as the above (prevention of erasing write data) can be obtained.

If CPU 30 receives a command from the optical disk controlling device 30 (step S1), CPU 30 checks whether or not an error exists at the time of writing back (step S2). If the error exists at the time of writing back, CPU 30 informs the error to the host computer 36 (step S3).

If the error does not exist at the time of writing back in step S2, CPU 30 checks whether or not the write command is received (step S4). If a command other than the write command is received, CPU 30 processes the command other than the write command (step S5).

If the write command is received in step S4, CPU 30 receives write data from the host computer 36, and stores write data in the data buffer area 43a of RAM 43 (step S6).

Then, if the reception of write data is ended (step S7), CPU 30 checks whether or not the data buffer area 43a is effective as write cache (step S8). The above check is performed based on whether or not data, which shows whether or not the data buffer area 43a can be used as write cache, is stored in EEPROM 41.

The check of the write cache by EEPROM 41 can be obtained based on the result of the trial writing shown in the flow chart of FIG. 7 (step S0). As a result of the check in step S8, if the write cache is effective, CPU 30 informs the normal end of the write command to the host computer 36 (step S9).

Sequentially, CPU 30 compares the number of writing times, which are stored in EEPROM 41 to correspond to the designated block number address provided to the write command, with the number of life times, which are stored in EEPROM 41 (step S10). If the number of writing times is not more than the number of times of histories, a normal write-back processing is executed (step S11). The write-back processing is that data stored in the data buffer area 43a of RAM 43 is written to the designated block of the optical disk 1.

After the writing, the value showing data of the number of times, which is placed in the area corresponding to the block address in which data of EEPROM is written, is incremented by one by the CPU 30 and the program.

If the number of writing times is more than the number of life times in step S10, CPU 30 executes the address alternate processing and the write-back processing (step S12). More specifically, the alternate block of the optical disk 1 is determined, and data, which is stored in the data buffer area 43a of RAM 43 is written to the determined alternate block.

Also, after the writing, the value showing data of the number of writing times, which is placed in the EEPROM corresponding to the alternated block address, is incremented by one.

As a result of the check in step S8, if the write cache is off in step S8, CPU 30 compares the number of writing times, which are stored in EEPROM 41 to correspond to the designated block number address provided to the write command, with the number of life times, which are stored in EEPROM 41 (FIG. 6, S13). If the number of writing times is not more than the number of life times, data stored in the data buffer area 43a of RAM 43 is written to the designated block of the optical disk 1 (step S14).

Also, after the writing, the value showing the number of writing times, which is placed in the EEPROM corresponding to the block address, is incremented by one.

As a result of the comparison in step S13, if the number of writing times is more than the number of life times, CPU 30 executes the processing in which the designated address is changed to the address of the alternate block of the optical disk 1, and data, which is stored in the data buffer area 43a of RAM 43 is written to the changed alternate block (step S15).

Also, after the writing, the value showing the number of writing times, which is placed in the EEPROM corresponding to the alternated block address, is incremented by one.

In this case, it is possible to count the number of writing times in each block of the optical disk instead of storing the number of writing data in the EEPROM 41.

In the case of the write-back processing, in order to keep the number of life times showing how many times data is written in the block, the number of life times are included in data to be written, and the number of life times are incremented. As a result, the number of life times in the block can be confirmed and the address can be changed at the next time of writing.

Then, CPU 30 checks whether or not the data writing is normally performed in step S14 or S15 (step S16). In a case where the data writing is normally performed, CPU 30 informs the normal end of the write command to the host computer 36 (step S17).

Also, in a case where the data writing is not normally performed, CPU 30 informs the host computer 36 of the abnormal end of the write command (step S18).

As mentioned above, according to the optical disk apparatus of the embodiment of the present invention, the bender unique area of the optical disk is used to periodically execute the trial writing for the vacant time when there is no command reception from the host computer, so that the writing operation can be confirmed. Then, if an abnormality occurs in the writing operation, the write cache function is turned off, thereby preventing write data received from the host computer from being lost.

In other words, the trial writing is periodically executed to check whether or not the writing operation is normally performed, so that the state of the writing operation can be always grasped. Then, if an abnormality occurs in the trial writing, the write cache is turned off before an abnormality occurs in the write-back processing. If the write command is received from the host computer in a state that the write cache is off, the end of the command is not informed to the host computer regardless of the normal/abnormal end until the processing for writing write data to the optical disk is ended. Thereby, write data cannot disappear.

Also, the contents of data of the trial writing are used as a specific pattern such that a trial pattern showing how many times the trial writing is executed is included in the specific pattern.

Moreover, in the system for checking whether the abnormality of the writing operation is the lifetime of the optical disk or the real abnormality of the writing operation, and for managing the accumulation of the number of writing times the logical block address of the write command received from the host computer relating to each optical disk, the following processing is performed.

More specifically, if the number of writing times of the block address exceed the number of life times showing the lifetime of the optical disk, the block alternate processing in which the block address is changed to be written is performed. As a result, reliability of data can be ensured, and the speed of the writing operation can be improved at the time of the alternate processing. In other words, as compared with a case of the alternate processing is performed when the writing operation is confirmed after the writing is once performed and abnormality is found out, the necessary processing time may be shortened if the alternate processing is executed from the beginning.

As mentioned above, according to the present invention, there can be provided the optical disk apparatus, which can prevent write data from being lost by testing the writing operation of the write-back processing.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing apparatus for writing data from an outer unit to an optical disk, the apparatus comprising:

means for receiving a data writing command from the outer unit or a data reading command and data to be processed;

means for writing the data to the optical disc in response to the receipt of the data writing command;

first writing means for writing testing data to a predetermined area of the optical disk during a time when the receiving means is not receiving the data;

first reading means for reading the testing data from the first storing means;

means for checking whether a writing operation of the first writing means is functioning normally based on the testing data read by the first reading means;

second writing means for writing the data received by the receiving means to a first address area of the storing means if the checking means determines that the writing operation of the first writing means is functioning normally; and second reading means for reading the data from the storing means if the receiving means receives the data reading command, wherein the second writing means has means for reading data of the first address area where the data is to be written to check the number of the area using times so as to write the data to a second address area different from the first address area if the number of times of using the first address area is more than a predetermined number.

2. A data processing apparatus for writing data from an outer unit to an optical disk, the apparatus comprising:

means for receiving a data writing command from the outer unit or a data reading command and data to be processed;

means for writing the data to the optical disc in response to the receipt of the data writing command;

first writing means for writing testing data to a predetermined area of the optical disk during a time when the receiving means is not receiving the data;

first reading means for reading the testing data from the first storing means;

means for checking whether a writing operation of the first writing means is functioning normally based on the testing data read by the first reading means;

second writing means for writing the data received by the receiving means to a first address area of the storing means if the checking means determines that the writing operation of the first writing means is functioning normally; and second reading means for reading the data from the storing means if the receiving means receives the data reading command, wherein the second writing means has means for reading data of the first address area of the storing means to check the number of the area using times if the checking means determines that the writing operation of the first writing means is not functioning normally, and for writing the data to the first address area if the number of the area using times is less than a predetermined number, and writing the data to the second address area which is different from the first address area if the number of the area using times is more than the predetermined number.

3. A data processing apparatus for writing data from an outer unit to an optical disk, the apparatus comprising:

means for receiving a data writing command from the outer unit or a data reading command and data to be processed;

means for writing the data to the optical disc in response to the receipt of the data writing command;

first writing means for writing testing data to a predetermined area of the optical disk during a time when the receiving means is not receiving the data;

first reading means for reading the testing data from the first storing means;

means for checking whether a writing operation of the first writing means functioning normally based on the testing data read by the first reading means;

second writing means for writing the data received by the receiving means to a first address area of the storing means if the checking means determines that the writing operation of the first writing means is functioning normally;

second reading means for reading the data from the storing means if the receiving means receives the data reading command;

third writing means for writing second test data to a second predetermined area different from the predetermined are if the first checking means determines that the writing operation of the first writing means is not functioning normally;

third reading means for reading the second test data written by the third writing means from the storing means;

second checking means for checking whether a writing operation of the third writing means is functioning normally based on the second test data read by the third reading means;

fourth writing means for writing the data received by the receiving means to the storing means if the second checking means determines that the writing operation of the third writing means is functioning normally; and means for storing a number of times the second predetermined area is used as a lifetime of the storing means if the second checking means determines that the writing operation of the third writing means is functioning normally.

4. A data processing apparatus for storing data received from an outer unit in an optical data storage medium comprising:

means for establishing communication with an outer unit;

receiving means for temporarily storing the data sent from the outer unit in the optical data storing medium;

first storing means for storing the data temporarily stored by the receiving means in a data storing area of the optical data storing medium during a vacant time when no communication with the outer unit is established by the communication establishing means;

means for reading specific data from a second area of the optical data storage medium, including second data defining how many times the data has been stored in the second area of the optical data storing medium if the first storing means is not executing a storing operation, and incrementing the amount represented by the second data by one each time data is stored in the second area;

second storing means for storing the specific data, including the incremented second data if the first storing means is not able to execute a storage operation properly;

means for reading data stored in the second storing means;

means for checking whether the data read by the reading means is normal;

third storing means for storing the incremented second data as a number data of life times defining a life of the optical data storing medium if the checking means determines that data read by the reading means is normal; and means for providing a response to the outer unit indicating an end of data storing in the optical data storing medium upon completion of the processing of data to be stored in the optical data storing medium by the receiving means if the checking means determines that data read by the reading means is normal, and the providing the response at a time when processing carried out by the second storing means is completed if the checking means determines that data read by the reading means is not normal.

5. A data processing apparatus for storing data received from an outer unit in an optical data storage medium comprising:

means for establishing communication with an outer unit so that first data is provided the data processing apparatus first storing means for storing second data defining how many times the first data received from the outer unit is stored in each of a plurality of areas of the optical data storing medium and for incrementing an amount represented by the second data every time the first data received from the outer unit is stored in these areas;

receiving means for temporarily storing the first data send from the outer unit in the optical data storing medium;

second storing means for storing the first data temporarily stored by the receiving means in a data storing area in the optical data storing medium during a vacant time when no communication with the outer unit is established by the communication establishing means;

means for reading specific data from a second area of the optical data storage medium, the specific data including third data defining how many times the first data has been stored in the second area of the optical data storing medium if the second storing means is not executing a storing operation and for incrementing the amount represented by the third data by one;

third storing means for storing the specific data, including the incremented third data, in the second area of the optical data storing medium if the second storing means is not able to execute a storing operation;

means for reading data stored in the third storing means;

means for checking whether the data read by the reading means is normal;

fourth storing means for storing fourth data corresponding to the incremented third data as a number data of life times defining a life of the optical data storing medium if the checking means determines that data read by the reading means is normal;

fifth storing means for comparing the fourth data with the second data and for storing the number data of life times in one of a third area or a fourth area different from the third area based on a result of the comparison; and means for providing a response to the outer unit indicating and end of data storing in the optical data storing medium upon completion of the processing of data to be stored in the optical data storing medium by the receiving means if the checking means determines that data read by the reading means is normal, and for providing the response at a time when processing the fifth storing means is completed if the checking means determines that data read by the reading means is not normal.

6. The apparatus according to claim 5, wherein the fifth storing means stores the second data in the third area if an amount represented by the second data is less than the further data, and stores the second data in the fourth area different from the third area if the second data is larger than the fourth data.

* * * * *